(12) United States Patent
Bloemendaal

(10) Patent No.: US 6,834,442 B1
(45) Date of Patent: Dec. 28, 2004

(54) CONVEYOR FOR GRAIN DRYER

(75) Inventor: Brent J. Bloemendaal, Zionsville, IN (US)

(73) Assignee: CTB IP, Inc., Wilmington, DE (US)

( * ) Notice: Subject to any disclaimer, the term of this patent is extended or adjusted under 35 U.S.C. 154(b) by 16 days.

(21) Appl. No.: 10/639,339

(22) Filed: Aug. 12, 2003

(51) Int. Cl.[7] .......................... F26B 17/00; B65G 19/08
(52) U.S. Cl. ........................... 34/166; 34/282; 198/733; 198/734
(58) Field of Search ................... 34/306, 282, 165, 34/166, 172, 173, 174, 371; 414/133, 140.9, 306; 198/733, 734, 359, 661; 460/114

(56) References Cited

U.S. PATENT DOCUMENTS

| | | | |
|---|---|---|---|
| 3,399,757 A | * | 9/1968 | Braun et al. ................ 198/727 |
| 3,704,780 A | * | 12/1972 | Aidin et al. ................ 209/678 |
| 4,064,638 A | | 12/1977 | Stanfield |
| 4,149,844 A | | 4/1979 | Noyes et al. |
| 4,249,891 A | | 2/1981 | Noyes et al. |
| 4,404,756 A | | 9/1983 | Noyes |
| 4,732,260 A | * | 3/1988 | Canziani ................ 198/370.02 |
| 5,467,535 A | | 11/1995 | Lentz |
| 5,992,044 A | | 11/1999 | Hanig |
| 6,076,276 A | * | 6/2000 | McKenzie et al. ............ 34/166 |
| 6,122,838 A | | 9/2000 | Bloemendaal |

* cited by examiner

*Primary Examiner*—Kenneth Rinehart
(74) *Attorney, Agent, or Firm*—Harness, Dickey & Pierce, P.L.C.

(57) ABSTRACT

A metering conveyor adapted to move a controlled volume of grain. The conveyor incorporates a series of carriers that can each be switched between a scooper assembly and a blocker assembly. The ratio of scooper assemblies to blocker assemblies determines the volume of grain that is metered for a predetermined conveyor speed. The conveyor is modular and is especially suited for a modular rectangular grain dryer. The conveyor further includes a paddle that is adapted to move grain to a discharge chute.

26 Claims, 4 Drawing Sheets

CONVEYOR FOR GRAIN DRYER

FIELD OF THE INVENTION

The present invention relates generally to grain dryers and more particularly to a metering conveyor for use with grain dryers.

BACKGROUND OF THE INVENTION

Continuous flow grain dryers generally include a column of drain which flows by gravity between parallel perforated walls. Heated air is forced through the perforated walls, thereby drying the grain. A metering system is generally incorporated in the lower portion of the grain dryer. The metering system is typically coupled to a control system that controls the discharge rate of grain exiting the dryer. Typically, it is desirable to dry grain to a preselected moisture content for storage or use. In order to attain a target moisture content for grain discharged from a grain dryer, the grain discharge rate should be accurately controlled.

Modular rectangular grain dryers can be supplied in varying lengths to accommodate various volumetric flow rates of grain, depending upon demand. A single discharge within a modular grain dryer requires that the grain discharge or metering rate be adjustable for the modular dryers in order to ensure a uniform moisture content of grain that is dried. Typically, rectangular grain dryers utilize metering rolls with an auger beneath to meter the grain from the dryer. What is therefore needed is an adjustable discharge conveyor for a modular grain dryer.

SUMMARY OF THE INVENTION

In accordance with the teachings of the present invention, an adjustable conveyor for a grain dryer is disclosed. In one form, the present invention provides a grain dryer that includes spaced apart inner and outer walls defining a chamber for directing grain therethrough and further defining a grain discharge opening between lower edges of the walls. A horizontal shelf is disposed adjacent the discharge opening for receiving grain from the chamber and a trough is disposed below the shelf for receiving grain from the shelf. The grain dryer further includes a conveyor including a paddle configured to push grain through the trough in a second direction, a scooper assembly configured to travel in a first direction over the shelf and used to meter grain from the shelf to the trough, and a blocker assembly is configured to prevent grain flow from the discharge opening.

In another form, the present invention provides a grain dryer that includes spaced apart inner and outer walls defining a chamber for directing grain therethrough and further defining a grain discharge opening between lower edges of the walls. A horizontal shelf is disposed adjacent the discharge opening for receiving grain from the chamber and a trough disposed below the shelf for receiving grain from the shelf. A conveyor to move a carrier along a fixed path. The carrier is configured to accept a scooper bracket, or a blocker panel. A scooper bracket is used to meter grain from the shelf to the trough and a blocker panel is configured to prevent grain flow from the discharge opening.

In yet another form, the present invention provides a method of manufacturing a metering conveyor system that includes providing a drive mechanism having a plurality of carriers attached thereto, wherein each carrier is configured to attach to either a scooper panel or a blocker panel, selecting a distance between a plurality of scooper panels, attaching the plurality of scooper panels to the drive mechanism at intervals equal to the selected distance, and attaching at least one blocker panel to the drive mechanism between the plurality of scooper panels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Moreover, while the present invention is described in detail in reference to a grain dryer, it is envisioned that the present invention is not limited to a grain dryer but also may be used in any other application that requires a metering conveyor for granular particles.

Figure 1:
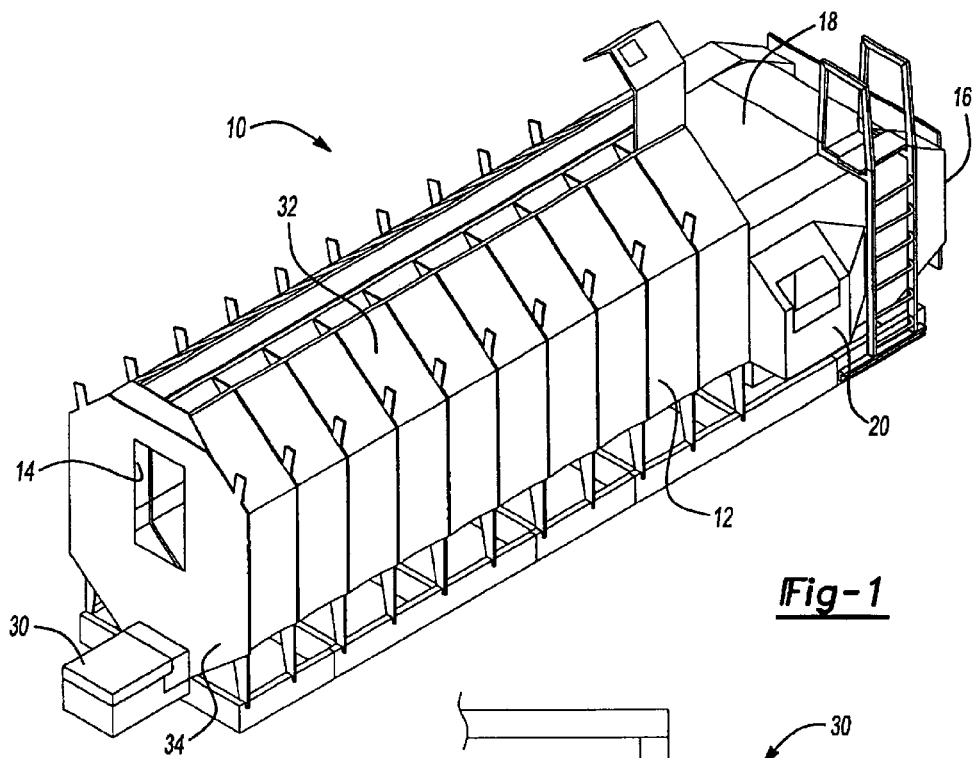
FIG. 1 is a perspective view of a modular rectangular grain dryer.
Figure 2:
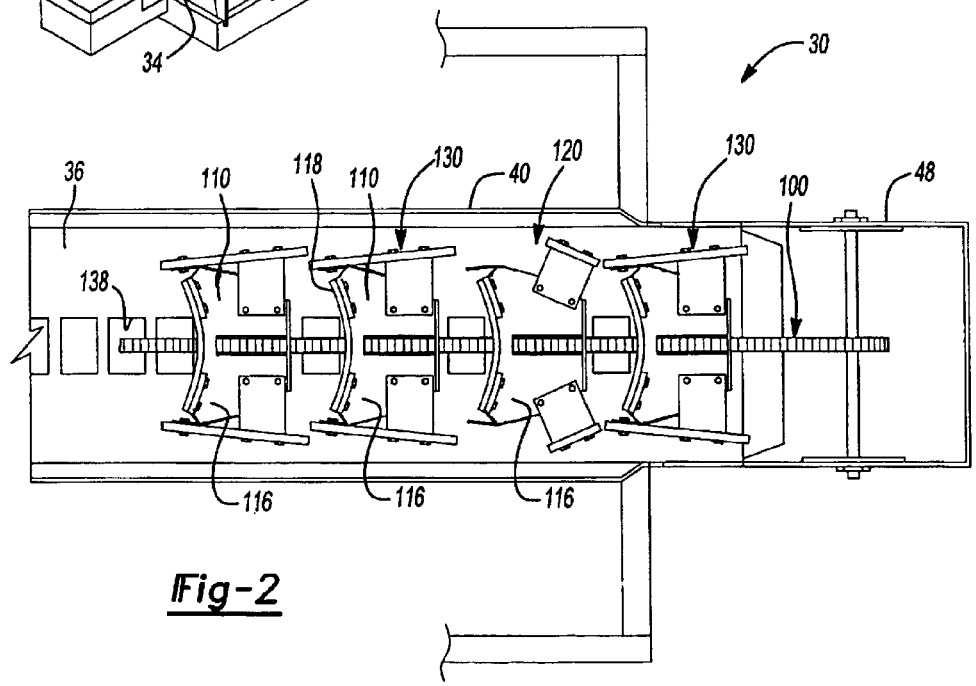
FIG. 2 is a top partial view of a conveyor in accordance with the teachings of the present invention.

With initial reference to FIG. 1, a grain dryer in accordance with the teachings of the present invention is shown and generally indicated by the reference numeral 10. Grain dryer 10 includes an outer housing 12 configured to allow air to pass therethrough, an inner housing 14 configure to allow air to pass therethrough, a fan 16, a heater 18, a control system 20, and a conveyor 30. Outer housing 12 is shown to include an upper portion 32, and a lower portion 34 with a shelf 36 extending therefrom. Inner housing 14 is shown in FIGS. 1 and 2 to include an upper portion 38 and a lower edge 40. Outer housing 12 and inner housing 14 define a column 42 that defines a grain flow path. Lower edge 40 of inner housing 14 and shelf 36 define a discharge opening 44 extending along the length of inner housing 14.

As presently preferred, grain dryer 10 is provided in a modular assembly wherein outer housing 12 and inner housing 14 are provided in about 2-foot sections. Each section added to a modular grain dryer 10 proportionally increases the volumetric capacity of the dryer. Conveyor 30 is provided as a modular assembly wherein portions can be added or removed to accommodate differing lengths of grain dryer 10, as discussed below. In this manner, grain dryer 10 provides a modular apparatus for drying grain that may be sized to accommodate various desired volumetric flow rates.

Figure 3:
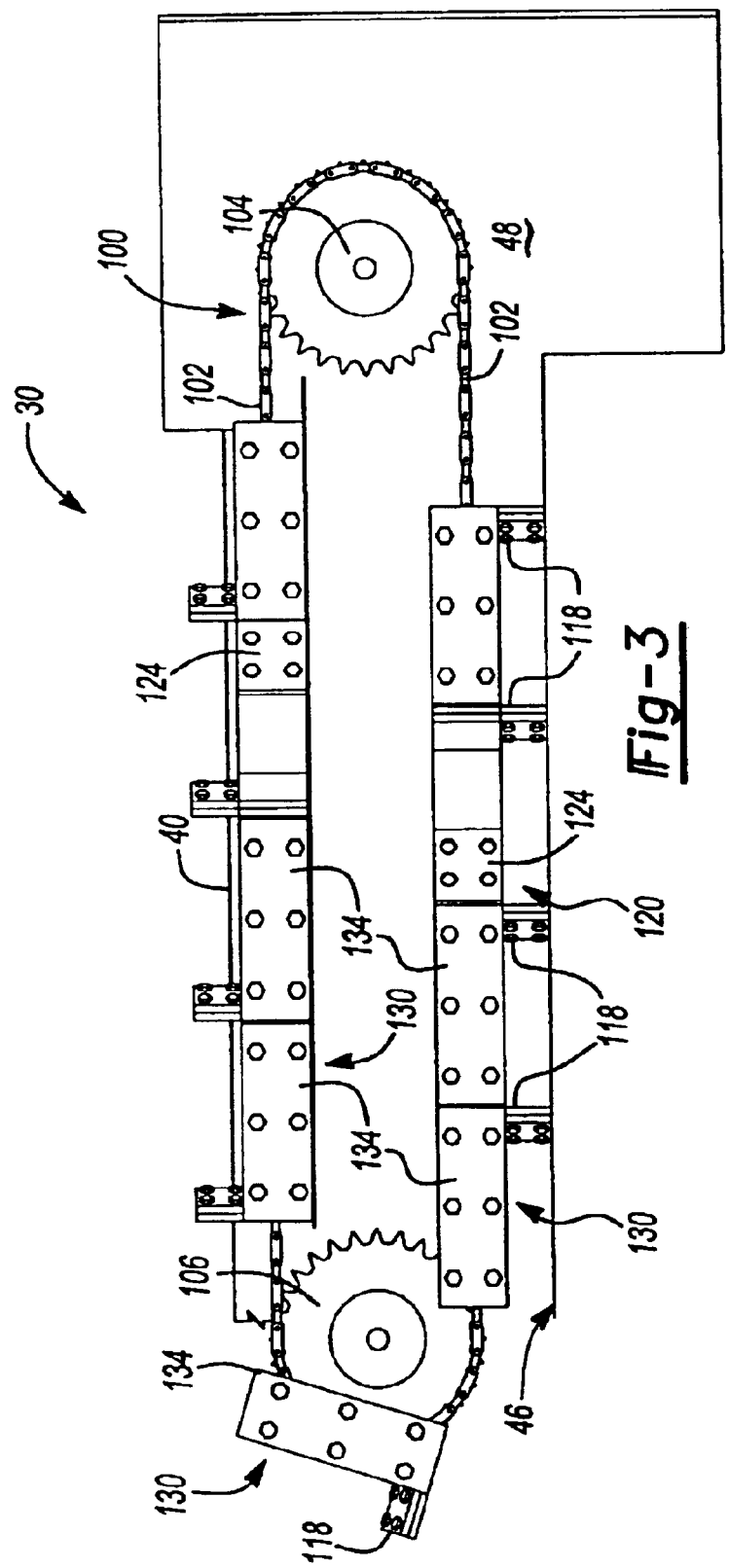
FIG. 3 is a side view of the conveyor of FIG. 2, shown with some scooper assemblies and blocker assemblies removed for clarity.
Figure 4:
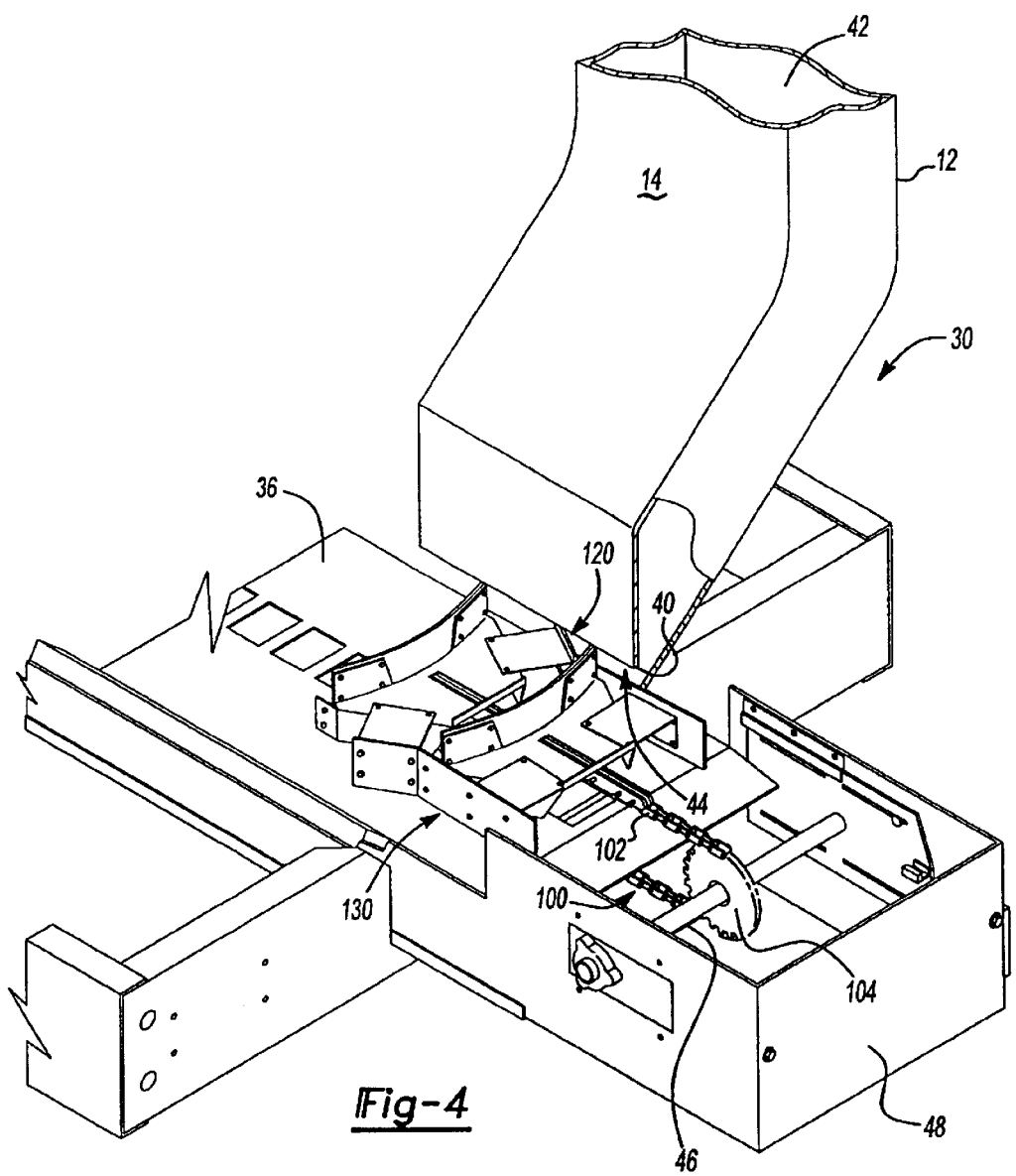
FIG. 4 is a perspective view of a portion of the conveyor of FIG. 2, showing the relative position of scooper assemblies and blocker assemblies.
Figure 5:
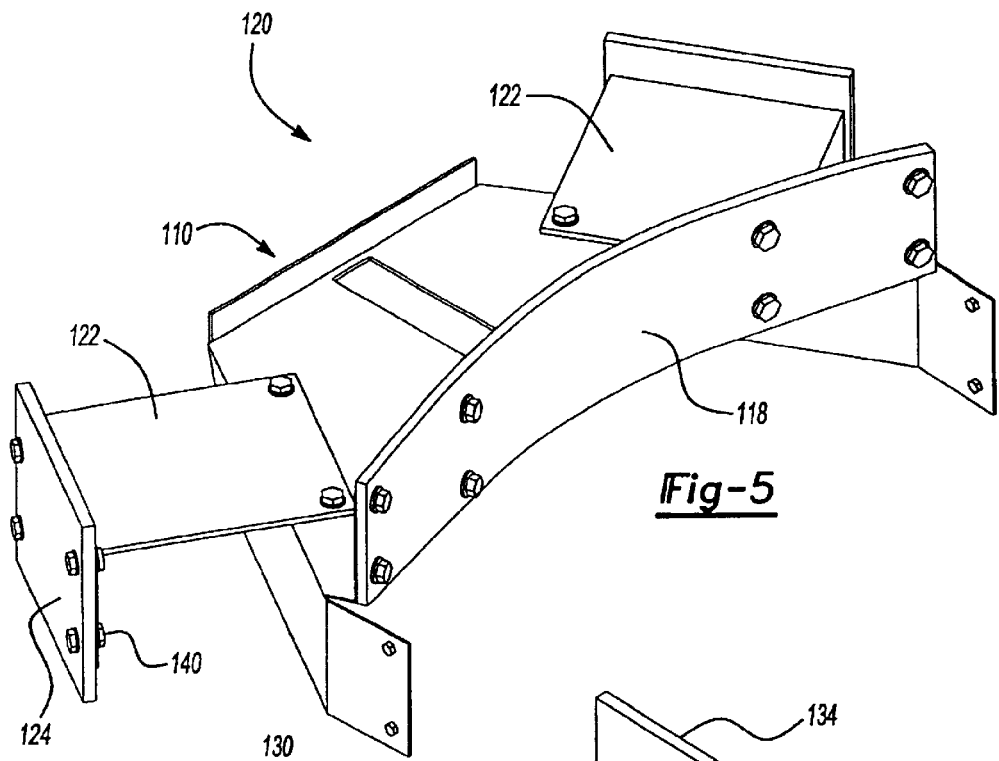
FIG. 5 is a perspective view of a scooper assembly of the conveyor of FIG. 2.
Figure 6:
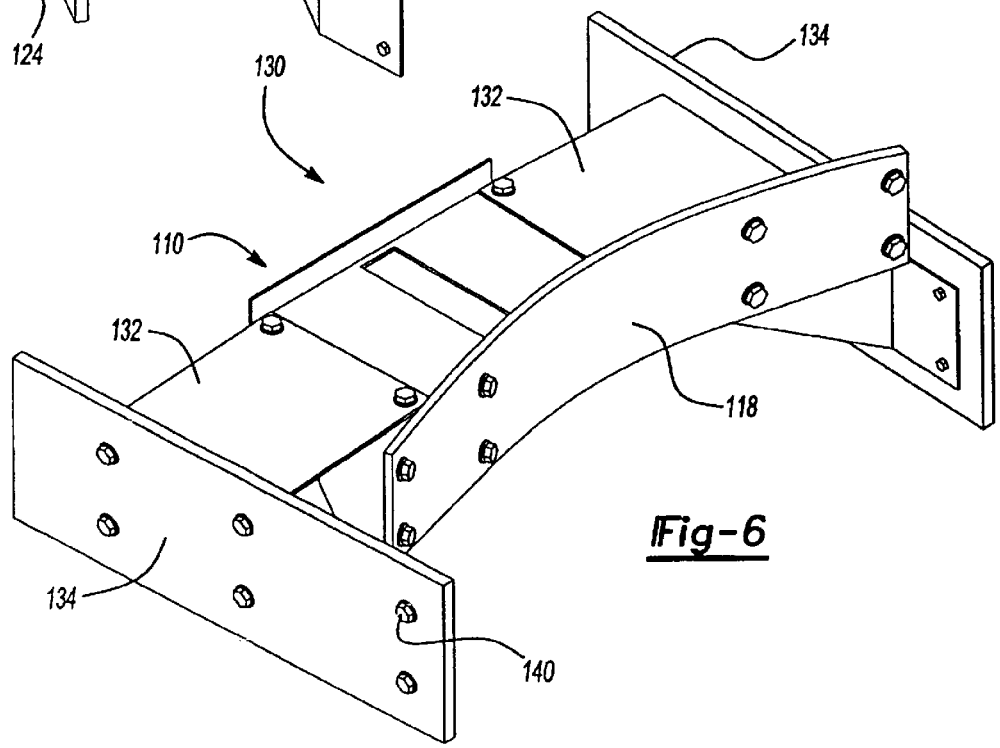
FIG. 6 is a perspective view of a blocker assembly of the conveyor of FIG. 2.

With reference to FIGS. 2, 3, and 4, discharge conveyor 30 is shown to include a trough 46, and a discharge chute 48. Conveyor 30 further includes a drive mechanism, or chain, 100 including a plurality of links 102 engaging a first sprocket 104 and a second sprocket 106. Conveyor 30 is further shown to include a plurality of base assemblies 110. Base assemblies 110 include a carrier 114 coupled to chain 100 and a paddle 118. Each carrier 114 is shown to include two sides 116. As best seen in FIG. 5, a scooper assembly 120 includes a base assembly 110, a scooper bracket 122 attached to each side 116, and a scooper panel 124. As seen in FIG. 6, a blocker assembly 130 includes a base assembly 110, a blocker bracket 132 attached to each side 116, and a blocker panel 134. In the embodiment illustrated, carrier 114, scooper bracket 122 and blocker bracket 132 are constructed of 14 gauge galvanized steel, and paddle 118, scooper panel 124, and blocker panel 134 are constructed of 3/16 inch ultra high molecular weight (UHMW) polyethylene As best seen in FIGS. 3 and 4, shelf 36 includes cutouts 138 to allow grain to fall from the level of shelf 36 to the trough 46. As discussed below, the scooper brackets 122 and the scooper panels 124 direct grain from discharge opening 44 to cutouts 138.

When assembled, conveyor 30 is shown in FIGS. 2 and 3 to include the chain 100 of links 102 that cycle around sprockets 104, 106. Because of the use of a continuous chain 100, the carrier 114 is carried in a first direction and then in a second direction which is generally opposite the first direction. At least a portion of the links 102 provide a locating position for carriers 114 to attach thereto. A carrier 114 is attached to a link 102 about every foot along the length of chain 100. Each carrier 114 is configured to be a portion of either a scooper assembly 120 or a blocker assembly 130. Thus provided, carriers 114 provide a selection of possible locating distances between scooper brackets 122 attached to different carriers 114. The carriers 114 that are not desired to act as scooper assemblies 120 are adapted to be blocker assemblies 130. In this manner, conveyor 30 provides a metering conveyor system that will scoop a predetermined amount of grain from shelf 36 that is generally proportional to the amount of selected scooper assemblies.

In operation, blocker panels 134 prevent grain from moving from discharge opening 44 to cutouts 138. Scooper panels 124 and scooper brackets 122 peel a predetermined volume of grain from discharge opening 44 and direct the grain to cutouts 138. The volume of grain moved by one scooper panel 124 depends upon variables such as the linear speed of conveyor 30, the height of grain on shelf 36, and the width of grain that the scooper panel 124 removes from shelf 36. The linear speed of conveyor 30 may be adjustable with control system 20. The height of grain removed from shelf 36 is determined by the height of discharge opening 44 and the proximity of scooper panel 124 to discharge opening 44. The width of grain removed from shelf 36 by one scooper panel 124 is the width of the grain that is pushed toward cutouts 138 by the scooper panel 124. As presently preferred, scooper panel 124 is positioned at an acute attack angle relative to the direction of chain 100 movement, and more preferably at an attack angle of less than about 45°.

As best seen in FIG. 2, conveyor 30 is configured such that scooper panels 124 divert grain from discharge opening 44 to trough 46 as carriers 114 cycle in a first direction, or away from discharge chute 48. Blocker panels 134 prevent grain from passing from discharge opening 44 to trough 46. In this manner, blocker assemblies 130 inhibit the flow of grain from shelf 36 to trough 46.

As best seen in FIG. 3, paddles 118 are configured to push grain through trough 46 as carriers 114 cycle in a second direction opposite the first direction, or toward discharge chute 48. As carriers 114 rotate about first sprocket 104, paddles 118 push grain from trough 46 into discharge chute 48. In this manner, conveyor 30 is configured to cycle in a fixed path, or continuous loop, and to direct the metered grain from shelf 36, to trough 46, and to a discharge 48.

When different sizes of dryers are provided, e.g. as a result of using more or fewer 2-foot grain dryer sections, the ratio of scooper assemblies to blocker assemblies may be changed as appropriate. To accomplish this change, scooper brackets 122 or blocker brackets 132 are detached from carriers 114 and the desired number of scooper brackets 122 or blocker brackets 132 and blocker panels 134 are coupled to the carriers 114. As best seen in FIGS. 5 and 6, both scooper brackets 122 and blocker brackets 132 are removably attached to carriers 114 with fasteners 140. As presently preferred, fasteners 140 are stainless steel bolts having complementary nuts attached thereto.

As presently preferred, carriers 114 are about one foot in length such that a carrier 114 is coupled to chain 100 about every 12 inches. A 20 foot grain dryer would include ten 2-foot sections of housing, 25 blocker assemblies 130, and 24 scooper assemblies 120. While FIGS. 2 and 3 depict the conveyor 30 with an approximate ratio of 2 blocker assemblies 130 to one scooper assembly 120, it is envisioned that this ratio can be any range of ratios required to accommodate a preselected volumetric flow rate. As will be appreciated, the speed of carriers 114 as they cycle through conveyor 30 can be altered to achieve a different grain flow rate. It is envisioned that a more consistent discharge rate is accomplished when the scooper assemblies 120 are evenly distributed along chain 100.

The description of the invention is merely exemplary in nature and, thus, variations that do not depart from the gist of the invention are intended to be within the scope of the invention. Such variations are not to be regarded as a departure from the sprit and scope of the invention.

What is claimed is:

1. A grain dryer comprising:
   spaced apart inner and outer walls having a vertical component defining a chamber for directing grain therethrough to a discharge opening;
   a generally horizontal shelf disposed adjacent the discharge opening;
   a trough disposed below the shelf for receiving grain from the shelf; and
   a conveyor configured to travel a fixed path defined in part by a first direction and a second direction, the conveyor including:
      a carrier paddle configured to push grain through the trough in the second direction,
      a scooper assembly having a scooper panel configured to travel over the shelf in the first direction and meter grain from the shelf to the trough, and
      a blocker assembly configured to inhibit grain flow from the discharge opening.

2. The grain dryer of claim 1, further comprising a carrier wherein the conveyor is configured to direct the carrier along the fixed path, wherein each scooper assembly and blocker assembly comprises a carrier.

3. The grain dryer of claim 1, wherein the conveyor further includes:
   a first sprocket,
   a second sprocket, an endless chain engaged with the first sprocket and the second sprocket, the chain including a plurality of links, wherein the links are configured to travel in the first direction from the first sprocket to the second sprocket and travel in the second direction from the second sprocket to the first sprocket.

4. The grain dryer of claim 1, wherein the conveyor further includes a carrier coupled to the chain, wherein the carrier is configured to be removably coupled to the scooper panel, and further configured to be removably coupled to a blocker panel.

5. The grain dryer of claim 4, wherein the conveyor further includes a plurality of carriers coupled to the chain, wherein each of the carriers is configured to be removably coupled to a pair of scooper panels, and further configured to be removably coupled to a pair of blocker panels.

6. The grain dryer of claim 1, wherein the ratio of the scooper assemblies to the blocker assemblies is from about 1 to 0.5 to about 1 to 2.

7. The grain dryer of claim 1, wherein the scooper panel is arranged at an attack angle of less than about 45 degrees.

8. The grain dryer of claim 1, wherein the blocker assembly includes a blocker panel.

9. The grain dryer of claim 8, wherein the blocker panel is constructed of ultra-high molecular weight polyethylene.

10. The grain dryer of claim 2, wherein the carrier is constructed of galvanized steel.

11. The grain dryer of claim 2, wherein the carrier is constructed of 14 gauge galvanized steel.

12. The conveyor of claim 1, wherein the scooper panel is constructed of ultra-high molecular weight polyethylene.

13. The conveyor of claim 1, wherein the carrier paddle is constructed of ultra-high molecular weight polyethylene.

14. A grain dryer comprising:

spaced apart inner and outer walls having a vertical component defining a chamber for directing grain therethrough to a discharge opening;

a generally horizontal shelf disposed adjacent the discharge opening;

a trough disposed below the shelf for receiving grain from the shelf; and a conveyor configured to move a carrier along a fixed path, the carrier being adapted to connect to either a scooper panel or a blocker panel, wherein the scooper panel is configured to meter grain from the shelf to the trough, and the blocker panel is configured to inhibit grain flow from the discharge opening.

15. The grain dryer of claim 14, wherein the carrier has two sides and wherein each side is adapted to connect to ether a scooper panel or a blocker panel.

16. The grain dryer of claim 14, wherein the carrier is a plurality of carriers.

17. The grain dryer of claim 14, further comprising a plurality of scooper panel, and a plurality of blocker panels, wherein a ratio of the scooper panels to the blocker panels is from about 1 to 0.5 to about 1 to 2.

18. The grain dryer of claim 14, wherein the blocker panel is constructed of ultra-high molecular weight polyethylene.

19. The grain dryer of claim 14, wherein the carrier is constructed of galvanized steel.

20. The grain dryer of claim 14, wherein the carrier is constructed of 14 gauge galvanized steel.

21. The conveyor of claim 14, wherein the scooper panel is constructed of ultra-high molecular weight polyethylene.

22. A method of manufacturing a metering conveyor system for a grain dryer comprising:

providing a drive mechanism having a plurality of carriers attached thereto with a substantially uniform spacing therebetween, wherein each carrier is configured to attach to either a scooper panel or a blocker panel;

selecting a distance between a plurality of scooper panels that is a multiple of the substantially uniform spacing;

attaching the plurality of scooper panels to carriers located at intervals equal to the selected distance; and attaching at least one blocker panel to a carrier located on the drive mechanism between the plurality of scooper panels.

23. The method of claim 22, further comprising providing the drive mechanism as a continuous loop so that grain is scooped in a first direction by the scooper panels and moved in a generally opposite direction by a carrier paddle, wherein the carrier paddle is coupled to the carrier.

24. The method of claim 22, further comprising coupling each carrier with either at least one blocker panel or at least one scooper panel.

25. The method of claim 22, wherein a ratio of the scooper panels to the blocker panels is from about 1 to 0.5 to about 1 to 2.

26. The method of claim 22, wherein selecting the distance is based upon factors including at least the length of a grain dryer.

* * * * *